(12) United States Patent
Hasegawa et al.

(10) Patent No.: US 12,128,964 B2
(45) Date of Patent: Oct. 29, 2024

(54) CONTROL DEVICE FOR VEHICLE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Kazuma Hasegawa, Anjo (JP); Yuji Fujita, Okazaki (JP); Yugo Nagashima, Anjo (JP); Masaharu Yamashita, Toyota (JP); Shintaro Takayama, Toyota (JP); Yosuke Yamashita, Nagoya (JP); Hiroki Tomizawa, Kariya (JP); Nobuyori Nakajima, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 237 days.

(21) Appl. No.: 17/966,043

(22) Filed: Oct. 14, 2022

(65) Prior Publication Data

US 2023/0119506 A1  Apr. 20, 2023

(30) Foreign Application Priority Data

Oct. 15, 2021  (JP) ................. 2021-169589

(51) Int. Cl.
*B62D 5/00*  (2006.01)
*B62D 5/04*  (2006.01)

(52) U.S. Cl.
CPC .......... *B62D 5/006* (2013.01); *B62D 5/0424* (2013.01); *B62D 5/0463* (2013.01); *B62D 5/0481* (2013.01)

(58) Field of Classification Search
CPC ........ B62D 5/00; B62D 5/006; B62D 5/0463; B62D 5/0481; B62D 5/0424
See application file for complete search history.

(56) References Cited

U.S. PATENT DOCUMENTS 4,597,487 A * 7/1986 Crosby ................... B30B 9/321
406/65
5,748,891 A * 5/1998 Fleming ................ G01S 5/0072
375/150

(Continued)

FOREIGN PATENT DOCUMENTS

JP  2009-248850 A  10/2009
JP  2020-108327 A  7/2020

(Continued)

OTHER PUBLICATIONS

Jul. 5, 2023 Extended European Search Report issued in European Patent Application No. 22201331.0.

*Primary Examiner* — John Kwon
(74) *Attorney, Agent, or Firm* — Oliff PLC

(57) ABSTRACT

A control device for a vehicle includes a plurality of control circuits configured to control a control object in cooperation or in combination by starting with powering-on of a vehicle as a trigger. Each of the plurality of control circuits is configured to perform a synchronization process and power latch control. Each of the plurality of control circuits is configured to maintain the operation mode immediately before the vehicle has been powered off in a period in which the power latch control is being performed. Each of the plurality of control circuits is configured not to perform the synchronization process in a predetermined period when the vehicle has been powered on.

6 Claims, 5 Drawing Sheets

(56) References Cited

U.S. PATENT DOCUMENTS

| | | | |
|---|---|---|---|
| 6,016,211 A * | 1/2000 | Szymanski | H04Q 11/0005 |
| | | | 398/1 |
| 2001/0033607 A1 * | 10/2001 | Fleming | H04B 1/707 |
| | | | 375/150 |
| 2011/0035107 A1 | 2/2011 | Izutani et al. | |
| 2020/0180685 A1 | 6/2020 | Suzuki et al. | |
| 2020/0207406 A1 | 7/2020 | Endoh et al. | |
| 2022/0166360 A1 | 5/2022 | Nakamura et al. | |
| 2022/0255343 A1 | 8/2022 | Mitani et al. | |
| 2022/0258794 A1 | 8/2022 | Takesaki et al. | |
| 2023/0117373 A1 * | 4/2023 | Nagashima | B62D 5/006 |
| | | | 701/41 |

FOREIGN PATENT DOCUMENTS

| | | |
|---|---|---|
| JP | 2021-75182 A | 5/2021 |
| WO | 2021/029407 A1 | 2/2021 |
| WO | 2021020357 A1 | 2/2021 |

* cited by examiner

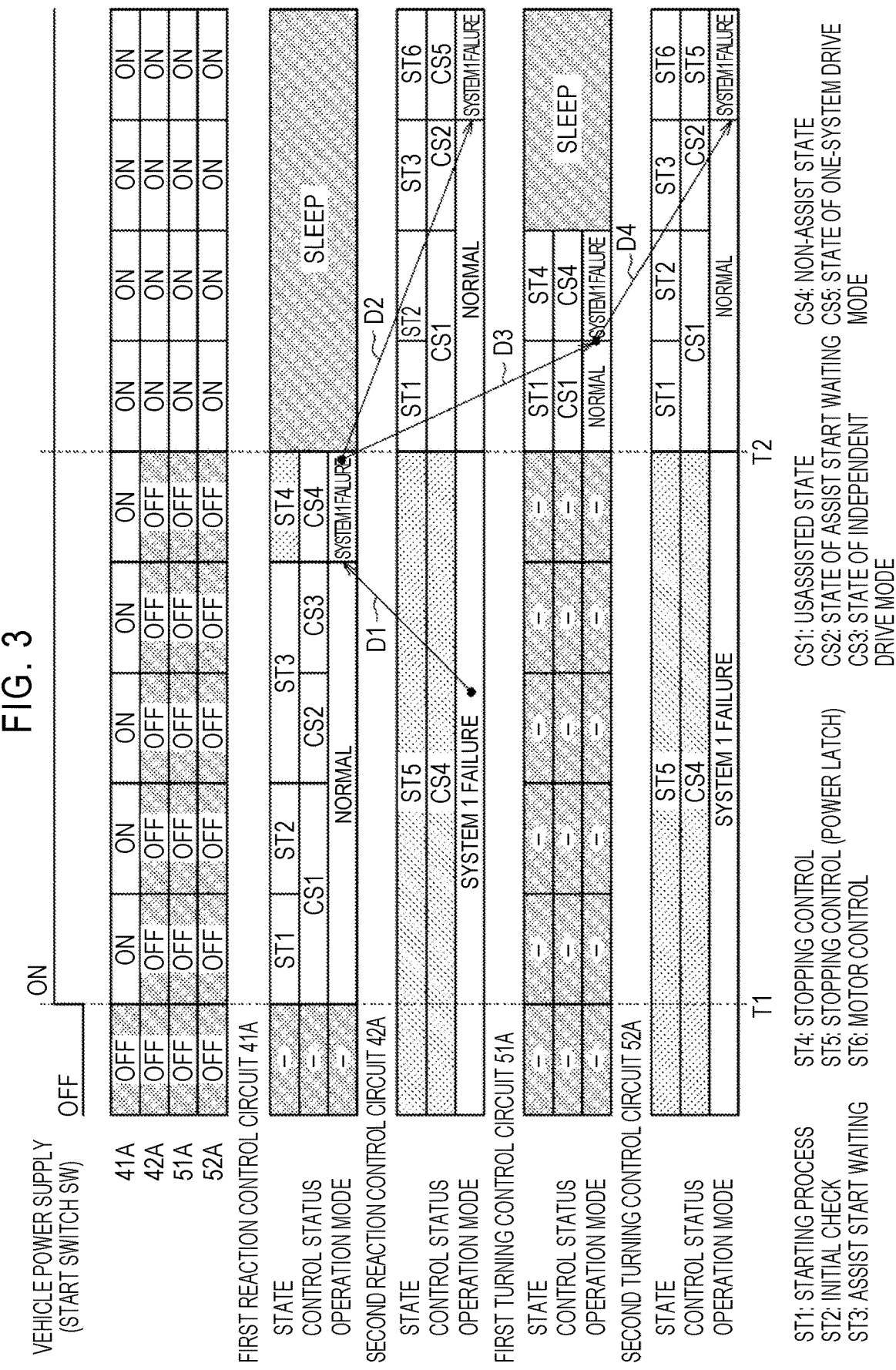

FIG. 4

| | OFF | ON | | | | | |
|---|---|---|---|---|---|---|---|
| Vehicle Power Supply (Start Switch SW) | | T1 | | | | T2 | |
| 41A | OFF | ON | ON | ON | ON | ON | ON |
| 42A | OFF | OFF | OFF | OFF | ON | ON | ON |
| 51A | OFF | OFF | OFF | OFF | ON | ON | ON |
| 52A | OFF | OFF | OFF | OFF | ON | ON | ON |

First Reaction Control Circuit 41A

| State | – | ST1 | ST2 | | ST3 | | ST6 |
|---|---|---|---|---|---|---|---|
| Control Status | – | CS1 | | | CS2 | | CS6 |
| Operation Mode | – | NORMAL | | | | | |

Second Reaction Control Circuit 42A

| State | ST5 | | | | ST1 | ST2 | ST6 |
|---|---|---|---|---|---|---|---|
| Control Status | CS4 | | | | CS1 | | CS6 |
| Operation Mode | SYSTEM 1 FAILURE | | | | NORMAL | | |

First Turning Control Circuit 51A

| State | – | – | – | – | ST1 | ST2 | ST6 |
|---|---|---|---|---|---|---|---|
| Control Status | – | – | – | – | CS1 | | CS6 |
| Operation Mode | – | – | – | – | NORMAL | | |

Second Turning Control Circuit 52A

| State | ST5 | | | | ST1 | ST2 | ST6 |
|---|---|---|---|---|---|---|---|
| Control Status | CS4 | | | | CS1 | | CS6 |
| Operation Mode | SYSTEM 1 FAILURE | | | | NORMAL | | |

ST1: STARTING PROCESS  
ST2: INITIAL CHECK  
ST3: ASSIST START WAITING  
ST4: STOPPING CONTROL  
ST5: STOPPING CONTROL (POWER LATCH)  
ST6: MOTOR CONTROL

CS1: USASSISTED STATE  
CS2: STATE ASSIST OF START WAITING  
CS3: STATE OF INDEPENDENT DRIVE MODE  
CS4: NON-ASSIST STATE  
CS5: STATE OF ONE-SYSTEM DRIVE MODE  
CS6: NORMAL CONTROL STATUS

CONTROL DEVICE FOR VEHICLE

CROSS-REFERENCE TO RELATED APPLICATION

This application claims priority to Japanese Patent Application No. 2021-169589 filed on Oct. 15, 2021 incorporated herein by reference in its entirety.

BACKGROUND

1. Technical Field

The disclosure relates to a control device for a vehicle.

2. Description of Related Art

A so-called steer-by-wire steering system in which transmission of power between a steering wheel and turning wheels is cut off is known. For example, a steer-by-wire system described in Japanese Unexamined Patent Application Publication No. 2021-075182 (JP 2021-075182 A) includes a reaction actuator and a turning actuator. The reaction actuator generates a steering reaction force which is applied to a steering shaft. The turning actuator generates a turning force for turning the turning wheels.

Each of the reaction actuator and the turning actuator includes two control arithmetic units which are redundantly provided and two motor driving units which are redundantly provided. Each control arithmetic unit performs an arithmetic operation associated with driving control of a motor. Each motor driving unit generates a torque based on a drive signal which is generated by the corresponding control arithmetic unit.

Two control arithmetic units of a first system and a second system of the reaction actuator can communicate with each other and cooperatively operate based on information transmitted and received therebetween. Two control arithmetic units of a first system and a second system of the turning actuator can communicate with each other and cooperatively operate based on information transmitted and received therebetween.

The control arithmetic unit of the first system of the reaction actuator and the control arithmetic unit of the first system of the turning actuator can communicate with each other. The control arithmetic unit of the second system of the reaction actuator and the control arithmetic unit of the second system of the turning actuator can communicate with each other. The two control arithmetic units of the first system and the two control arithmetic units of the second system cause the corresponding motor driving units to generate torques commonly using information transmitted and received through inter-system communication.

In the related art, an electric power steering system that assists with an operation of a steering wheel is known. A control device for the electric power steering system causes an assist motor to generate an assist force based on a steering state of the steering wheel. For example, a control device described in Japanese Unexamined Patent Application Publication No. 2009-248850 (JP 2009-248850 A) performs power latch control for continuously performing control until a predetermined time elapses after an ignition key has been turned off. When a steering wheel is operated while power latch control is being performed, assisting with steering using a motor is performed.

In a control device for an electric power steering system described in Japanese Unexamined Patent Application Publication No. 2020-108327 (JP 2020-108327 A), when a vehicle is powered off, power latch control for continuously performing a temperature estimating operation for an element on a board or the like is performed after supply of a motor driving current has been stopped. The control device maintains a power-on state until a predetermined time elapses after supply of the motor driving current has been stopped or until the temperature of an element on the board becomes equal to or less than a predetermined value.

SUMMARY

It is conceivable that power latch control as described in JP 2009-248850 A or JP 2020-108327 A be performed in the steer-by-wire system including a plurality of systems as described in JP 2021-075182 A. In this case, the control arithmetic units individually perform power latch control with powering-off of the vehicle due to an operation of an ignition key or the like as a trigger. When the vehicle is powered on while the power latch control is being performed, the control arithmetic units determine whether the vehicle is powered on and are restarted after it is determined that the vehicle is powered on.

When the vehicle is powered on while the power latch control is being performed, timings at which the control arithmetic units recognize powering-on of the vehicle may not match due to a difference in wiring resistance or the like. Accordingly, there is concern that timings at which the control arithmetic units are restarted may also mismatch. As a result, an earlier restarted control arithmetic unit may perform an unintentional state transition by receiving pre-initialization information calculated by another control arithmetic unit that is still performing power latch control.

According to an aspect of the disclosure, there is provided a control device for a vehicle. The control device for the vehicle includes a plurality of control circuits configured to control a control object in cooperation or in combination by starting with powering-on of a vehicle as a trigger. Each of the plurality of control circuits is configured to perform a synchronization process and power latch control. The synchronization process is a process of synchronizing operation modes of the control object which are determined based on operation states thereof with each other, and the power latch control is control for maintaining supply of electric power in a defined period with powering-off of the vehicle as a trigger. Each of the plurality of control circuits is configured to maintain the operation mode immediately before the vehicle has been powered off in a period in which the power latch control is being performed. Each of the plurality of control circuits is configured not to perform the synchronization process in a predetermined period when the vehicle has been powered on. The predetermined period is a period from a time point at which the vehicle has been powered on to a time point at which all of the plurality of control circuits have started normally and are able to control the control object.

When the vehicle is powered on, there is concern that timings at which the control circuits recognize powering-on of the vehicle or timings at which the control circuits start may not match due to a difference in wiring resistance or the like. Accordingly, for example, when the vehicle is powered on while power latch control is being performed, there is concern that a control circuit having started earlier may perform an unintentional state transition by synchronizing the operation mode maintained therein with a pre-initialization operation mode maintained in another control circuit that is still performing the power latch control.

In this regard, with this configuration, when the vehicle is powered on, the plurality of control circuits does not perform the synchronization process in the period from the time point at which the vehicle has been powered on to the time point at which all of the plurality of control circuits normally start and are able to control the control object. Accordingly, when the vehicle has been powered on while power latch control is being performed, a control circuit having started earlier does not synchronize the operation mode maintained therein with an operation mode maintained in another control circuit. As a result, it is possible to prevent the control circuit having started earlier from performing an unintentional state transition.

In the control device for the vehicle, the operation mode may include an operation mode when all of the plurality of control circuits are normal and an operation mode when one of the plurality of control circuits is abnormal.

For example, when the vehicle is powered on again in the period in which the power latch control is being performed after the vehicle has been powered off in a state in which an abnormality of a specific control circuit of the plurality of control circuits has been determined, the specific control circuit may be in a state in which the specific control circuit is able to return to a normal operation. It is also conceivable that the specific control circuit start earlier than another control circuit. In this case, when the specific control circuit synchronizes the operation mode of the control object maintained therein with an abnormal operation mode maintained in another control circuit, a situation may arise in which although the specific control circuit is in a state in which it is able to return to a normal operation, it may control the control object based on the abnormal operation mode.

In this regard, with this configuration, the specific control circuit does not synchronize the operation mode of the control object maintained therein with an abnormal operation mode maintained in another control circuit in the period from the time point at which the vehicle has been powered on to the time point at which all of the plurality of control circuits normally start and are able to control the control object. As a result, it is possible to prevent the control circuit having started earlier from performing an unintentional state transition.

In the control device for the vehicle, the control object may include: a reaction motor that includes winding groups of two systems and generates a steering reaction force which is applied to a steering wheel of which transmission of power to and from turning wheels is cut off; and a turning motor that generates a turning force for turning the turning wheels. The plurality of control circuits may include: a first reaction control circuit configured to control supply of electric power to a winding group of a first system of the reaction motor; a second reaction control circuit configured to control supply of electric power to a winding group of a second system of the reaction motor; a first turning control circuit configured to control supply of electric power to a winding group of the first system of the turning motor; and a second turning control circuit configured to control supply of electric power to a winding group of the second system of the turning motor.

With this configuration, when the vehicle is powered on, for example, the first reaction control circuit does not perform the synchronization process in the period to the time point at which all of the second reaction control circuit, the first turning control circuit, and the second turning control circuit in addition to the first reaction control circuit have started normally and are able to control the reaction motor or the turning motor. This is true of the second reaction control circuit, the first turning control circuit, and the second turning control circuit, the same as for the first reaction control circuit. Accordingly, when the vehicle has been powered on while power latch control is being performed, the first reaction control circuit, the second reaction control circuit, the first turning control circuit, or the second turning control circuit having started earlier does not synchronize the operation mode of the reaction motor or the turning motor maintained therein with an operation mode maintained in another control circuit. As a result, it is possible to prevent the first reaction control circuit, the second reaction control circuit, the first turning control circuit, and the second turning control circuit having started earlier from performing an unintentional state transition.

In the control device for the vehicle, the synchronization process may be performed between the first reaction control circuit and the second reaction control circuit, between the first turning control circuit and the second turning control circuit, between the first reaction control circuit and the first turning control circuit, and between the second reaction control circuit and the second turning control circuit.

With this configuration, it is possible to simplify signal paths in comparison with a configuration in which the first reaction control circuit, the second reaction control circuit, the first turning control circuit, and the second turning control circuit perform the synchronization process with all the other control circuits other than the corresponding control circuit. For example, it is not necessary to provide a communication line between the first reaction control circuit and the second turning control circuit and a communication line between the second reaction control circuit and the first turning control circuit.

In the control device for the vehicle, the control object may include: a reaction motor that is a source of a steering reaction force which is applied to a steering wheel of which transmission of power to and from turning wheels is cut off; and a turning motor that is a source of a turning force for turning the turning wheels. The plurality of control circuits may include: a reaction control circuit configured to control the reaction motor; and a turning control circuit configured to control the turning motor.

With this configuration, when the vehicle is powered on while power latch control is being performed and, for example, the reaction control circuit starts earlier, the reaction control circuit having started earlier does not synchronize the operation mode of the control object maintained therein with an operation mode maintained in the turning control circuit. As a result, it is possible to prevent the reaction control circuit having started earlier from performing an unintentional state transition. This is true of the turning control circuit, the same as for the reaction control circuit.

In the control device for the vehicle, the control object may include an assist motor that generates an assist force for assisting with an operation of a steering wheel. The assist motor may include a winding group of a first system and a winding group of a second system. The plurality of control circuits may include: a first assist control circuit configured to control supply of electric power to the winding group of the first system; and a second assist control circuit configured to control supply of electric power to the winding group of the second system.

With this configuration, when the vehicle is powered on while power latch control is being performed and, for example, the first assist control circuit starts earlier, the first assist control circuit having started earlier does not synchronize the operation mode of the assist motor maintained therein with an operation mode maintained in the second assist control circuit. As a result, it is possible to prevent the first assist control circuit having started earlier from performing an unintentional state transition. This is true of the second assist control circuit, the same as for the first assist control circuit.

With the control device for the vehicle according to the disclosure, it is possible to curb an unintentional state transition when the vehicle is powered on while power latch control is being performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a timing chart illustrating state transitions of control circuits according to a comparative example;

FIG. 4 is a timing chart illustrating state transitions of control circuits according to the first embodiment.

DETAILED DESCRIPTION OF EMBODIMENTS

First Embodiment

Hereinafter, a first embodiment in which a control device for a vehicle is embodied for a steer-by-wire steering system will be described.

Figure 1:
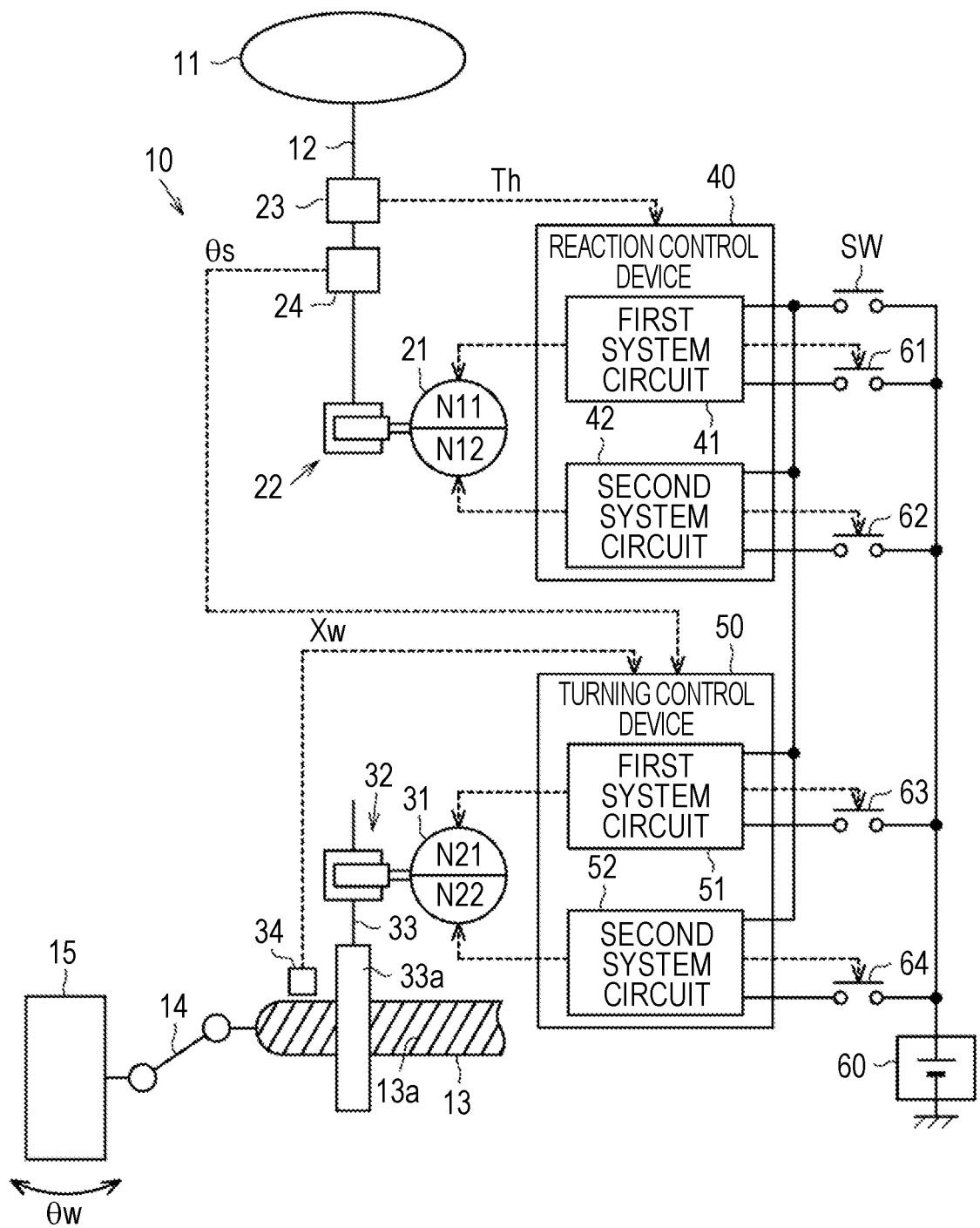
FIG. 1 is a diagram illustrating a configuration of a steer-by-wire steering system in which a control device for a vehicle according to a first embodiment is mounted.

As illustrated in FIG. 1, a steering system 10 of a vehicle includes a steering shaft 12 that is connected to a steering wheel 11. The steering system 10 includes a turning shaft 13 that extends in a vehicle width direction (in a right-left direction in FIG. 1). Turning wheels 15 are connected to both ends of the turning shaft 13 via tie rods 14. When the turning shaft 13 moves linearly, a turning angle $\theta w$ of the turning wheels 15 changes. The steering shaft 12 and the turning shaft 13 constitute a steering mechanism of the vehicle. Only one turning wheel 15 is illustrated in FIG. 1.

The steering system 10 includes a reaction motor 21 and a reduction gear mechanism 22. The reaction motor 21 is a source of a steering reaction force. A steering reaction force is a force which acts in a direction opposite to an operating direction of the steering wheel 11 which is operated by a driver. A rotation shaft of the reaction motor 21 is connected to the steering shaft 12 via the reduction gear mechanism 22. A torque of the reaction motor 21 is applied as a steering reaction force to the steering shaft 12. An appropriate feeling of response can be given to the driver by applying the steering reaction force to the steering wheel 11.

The reaction motor 21 is, for example, a three-phase brushless motor. The reaction motor 21 includes a winding group N11 of a first system and a winding group N12 of a second system. The winding group N11 of the first system and the winding group N12 of the second system are wound on a common stator (not illustrated). The winding group N11 of the first system and the winding group N12 of the second system have the same electric characteristics.

The steering system 10 includes a turning motor 31 and a reduction gear mechanism 32. The turning motor 31 is a source of a turning force. A turning force refers to a force for turning the turning wheels 15. A rotation shaft of the turning motor 31 is connected to a pinion shaft 33 via the reduction gear mechanism 32. Pinion teeth 33a of the pinion shaft 33 engages with rack teeth 13b of the turning shaft 13. A torque of the turning motor 31 is applied as a turning force to the turning shaft 13 via the pinion shaft 33. The turning shaft 13 moves in the vehicle width direction with rotation of the turning motor 31.

The turning motor 31 is, for example, a three-phase brushless motor. The turning motor 31 includes a winding group N21 of the first system and a winding group N22 of the second system. The winding group N21 of the first system and the winding group N22 of the second system are wound on a common stator (not illustrated). The winding group N21 of the first system and the winding group N22 of the second system have the same electric characteristics.

The steering system 10 includes a reaction control device 40. The reaction control device 40 controls driving of the reaction motor 21 which is a control object. The reaction control device 40 performs reaction control such that a steering reaction force corresponding to a steering torque Th is generated by the reaction motor 21. The reaction control device 40 calculates a target steering reaction force based on the steering torque Th detected by a torque sensor 23. The torque sensor 23 is provided in the steering shaft 12. The reaction control device 40 controls supply of electric power to the reaction motor 21 such that an actual steering reaction force applied to the steering shaft 12 reaches the target steering reaction force. The reaction control device 40 controls supply of electric power to the winding groups of two systems in the reaction motor 21 independently by systems.

The reaction control device 40 includes a first system circuit 41 and a second system circuit 42. The first system circuit 41 controls supply of electric power to the winding group N11 of the first system in the reaction motor 21 based on the steering torque Th detected by the torque sensor 23. The second system circuit 42 controls supply of electric power to the winding group N12 of the second system in the reaction motor 21 based on the steering torque Th detected by the torque sensor 23.

The steering system 10 includes a turning control device 50. The turning control device 50 controls driving of the turning motor 31 which is a control object. The turning control device 50 performs turning control for causing the turning motor 31 to generate a turning force for turning the turning wheels 15 based on a steering state. The turning control device 50 receives a steering angle $\theta s$ detected by a steering angle sensor 24 and a stroke Xw of the turning shaft 13 detected by a stroke sensor 34. The stroke Xw is a displacement with respect to a neutral position of the turning shaft 13 and is a state variable in which a turning angle $\theta w$ is reflected. The steering angle sensor 24 is provided between the torque sensor 23 and the reduction gear mechanism 22 in the steering shaft 12. The stroke sensor 34 is provided in the vicinity of the turning shaft 13.

The turning control device 50 calculates a target turning angle of the turning wheels 15 based on the steering angle $\theta s$ detected by the steering angle sensor 24. The turning control device 50 calculates a turning angle $\theta w$ based on the stroke Xw of the turning shaft 13 detected by the stroke sensor 34. The turning control device 50 controls supply of electric power to the turning motor 31 such that the turning angle $\theta w$ calculated based on the stroke Xw reaches the target turning angle. The turning control device 50 controls supply of electric power to the winding group of the second system in the turning motor 31 independently by the systems.

The turning control device 50 includes a first system circuit 51 and a second system circuit 52. The first system circuit 51 controls supply of electric power to the winding group N21 of the first system in the turning motor 31 based on the steering angle θs detected by the steering angle sensor 24 and the stroke Xw of the turning shaft 13 detected by the stroke sensor 34. The second system circuit 52 controls supply of electric power to the winding group N22 of the second system in the turning motor 31 based on the steering angle θs detected by the steering angle sensor 24 and the stroke Xw of the turning shaft 13 detected by the stroke sensor 34.

A so-called mechanically and electrically integrated type reaction actuator may be constructed by integrally providing the reaction control device 40 and the reaction motor 21. A so-called mechanically and electrically integrated type turning actuator may be constructed by integrally providing the turning control device 50 and the turning motor 31.

Power Supply Path

Power supply paths for the reaction control device 40 and the turning control device 50 will be described below. Various types of onboard devices including the reaction control device 40 and the turning control device 50 are supplied with electric power from a DC power source 60. The DC power source 60 is, for example, a battery. Various types of sensors including the torque sensor 23, the steering angle sensor 24, and the stroke sensor 34 are supplied with electric power from the DC power source 60.

The first system circuit 41 and the second system circuit 42 of the reaction control device 40 and the first system circuit 51 and the second system circuit 52 of the turning control device 50 are connected to the DC power source 60 via a start switch SW of the vehicle. The start switch SW is, for example, an ignition switch or a power switch. The start switch SW is operated when a traveling drive source of a vehicle such as an engine is started or stopped. When the start switch SW is turned on, electric power from the DC power source 60 is supplied to the first system circuit 41 and the second system circuit 42 of the reaction control device 40 and the first system circuit 51 and the second system circuit 52 of the turning control device 50 via the start switch SW. Turning on the start switch SW is to power on the vehicle. Turning off the start switch SW is to power off the vehicle.

The first system circuit 41 and the second system circuit 42 of the reaction control device 40 and the first system circuit 51 and the second system circuit 52 of the turning control device 50 are connected to the DC power source 60 via power supply relays 61, 62, 63, and 64. When the power supply relays 61, 62, 63, and 64 are turned on, electric power from the DC power source 60 is supplied to the first system circuit 41 and the second system circuit 42 of the reaction control device 40 and the first system circuit 51 and the second system circuit 52 of the turning control device 50 via the power supply relays 61, 62, 63, and 64.

The first system circuit 41 of the reaction control device 40 controls turning-on/off of the power supply relay 61. The first system circuit 41 performs power latch control for maintaining the power supply relay 61 in an ON state for a predetermined period when the start switch SW is switched from an ON state to an OFF state. Accordingly, the first system circuit 41 can operates even after the start switch SW has been turned off. The first system circuit 41 can cut off supply of electric power thereto by switching the power supply relay 61 from the on state to the off state when a predetermined period elapses.

The first system circuit 41 detects turning-on/off of the start switch SW, for example, by monitoring a voltage between both ends of the start switch SW. The first system circuit 41 detects that the start switch SW has been turned on when the voltage between both ends of the start switch SW is less than a predetermined voltage threshold value. The first system circuit 41 detects that the start switch SW has been turned off when the voltage between both ends of the start switch SW is equal to or greater than the predetermined voltage threshold value.

The second system circuit 42 of the reaction control device 40 controls turning-on/off of the power supply relay 62. Similarly to the first system circuit 41, the second system circuit 42 performs power latch control. The second system circuit 42 maintains the power supply relay 62 in an ON state for a predetermined period when the start switch SW is switched from the ON state to the OFF state.

The first system circuit 51 of the turning control device 50 controls turning-on/off of the power supply relay 63. Similarly to the first system circuit 41 of the reaction control device 40, the first system circuit 51 performs power latch control. The first system circuit 51 maintains the power supply relay 63 in an ON state for a predetermined period when the start switch SW is switched from the ON state to the OFF state.

The second system circuit 52 of the turning control device 50 controls turning-on/off of the power supply relay 64. Similarly to the first system circuit 41 of the reaction control device 40, the second system circuit 52 performs power latch control. The second system circuit 52 maintains the power supply relay 64 in an ON state for a predetermined period when the start switch SW is switched from the ON state to the OFF state.

Elements such as the torque sensor 23, the steering angle sensor 24, and the stroke sensor 34 required to operate even after the start switch SW has been turned off out of elements of the steering system 10 are connected to the DC power source 60 via at least one of the power supply relays 61, 62, 63, and 64. Accordingly, when the start switch SW is turned off and at least one of the power supply relays 61, 62, 63, and 64 is turned on, the elements such as the torque sensor 23, the steering angle sensor 24, and the stroke sensor 34 is continuously supplied with electric power.

Reaction Control Device

Figure 2:
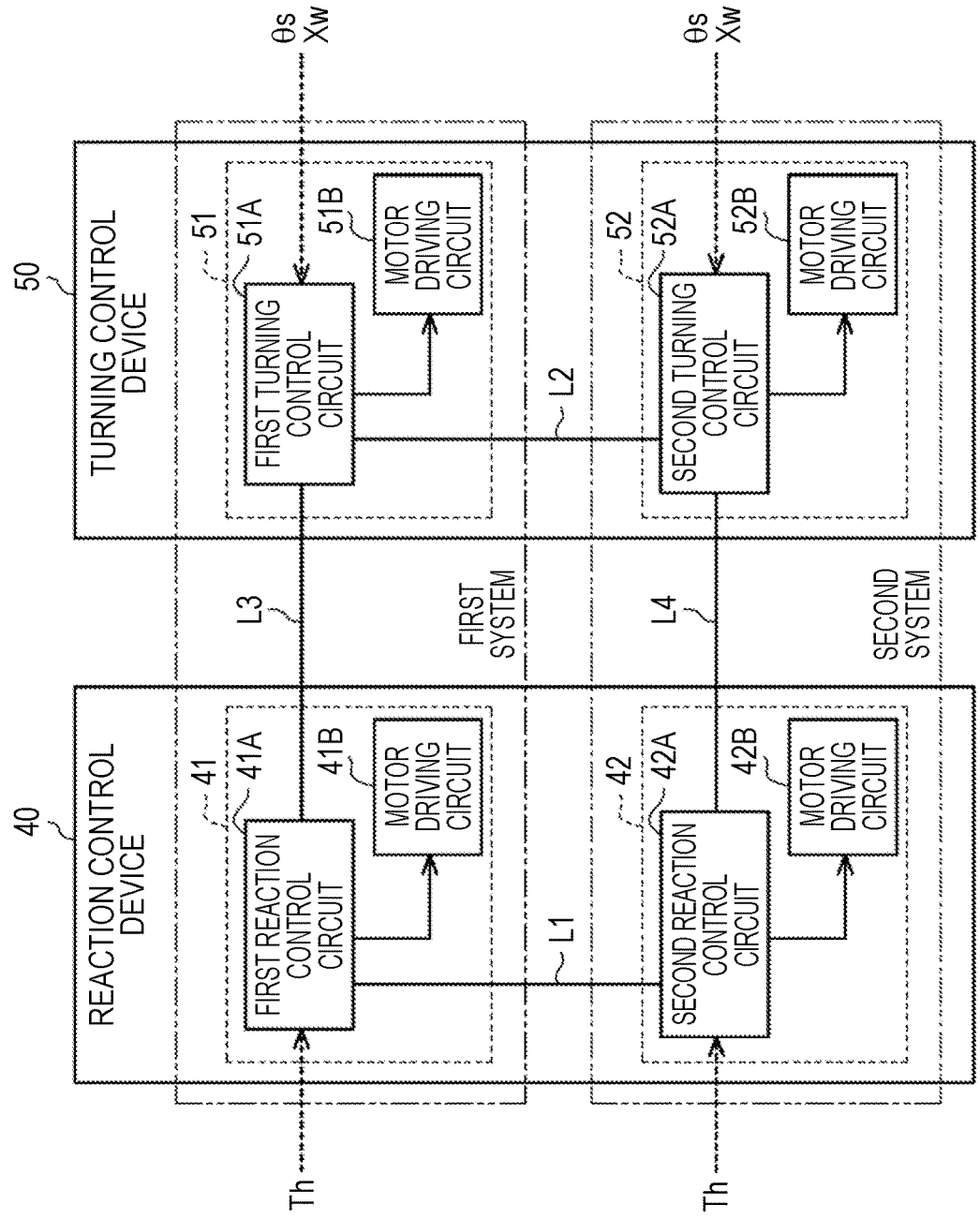
FIG. 2 is a block diagram illustrating a reaction control device and a turning control device according to the first embodiment.

The configuration of the reaction control device 40 will be described below in detail. As illustrated in FIG. 2, the reaction control device 40 includes the first system circuit 41 and the second system circuit 42. The first system circuit 41 includes a first reaction control circuit 41A and a motor driving circuit 41B. The second system circuit 42 includes a second reaction control circuit 42A and a motor driving circuit 42B.

The first reaction control circuit 41A is constituted by a processing circuit including (1) one or more processors that operate in accordance with a computer program (software), (2) one or more dedicated hardware circuits such as an application-specific integrated circuit (ASIC) that perform at least some of various processes, or (3) a combination thereof. The processor includes a central processing unit (CPU). The processor includes memories such as a randomaccess memory (RAM) and a read-only memory (ROM). The memories store program codes or commands configured to cause the CPU to perform processing. Memories, that is, non-transitory computer-readable media, include all available media that can be accessed by a general-purpose or dedicated computer.

The first reaction control circuit 41A calculates a target steering reaction force to be generated by the reaction motor 21 based on the steering torque Th detected by the torque sensor 23 and calculates a first current command value for the winding group N11 of the first system based on the value of the calculated target steering reaction force. Here, the first current command value is set to a value of a half (50%) of an amount of current (100%) required for the reaction motor 21 to generate the target steering reaction force. The first reaction control circuit 41A generates a drive signal (a PWM signal) for the motor driving circuit 41B by performing current feedback control for causing a value of an actual current supplied to the winding group N11 of the first system to conform to the first current command value.

The motor driving circuit 41B is a PWM inverter in which three legs corresponding to three phases (U, V, and W) are connected in parallel with switching elements such as two field effect transistors (FETs) connected in series as a leg which is a basic unit. The motor driving circuit 41B converts DC electric power supplied from the DC power source 60 to three-phase AC electric power by switching the switching elements of the phases based on a drive signal generated by the first reaction control circuit 41A. The three-phase AC electric power generated by the motor driving circuit 41B is supplied to the winding group N11 of the first system of the reaction motor 21 via power supply paths of the phases including a bus bar or a cable. Accordingly, the winding group N11 of the first system generates a torque corresponding to the first current command value.

The second reaction control circuit 42A basically has the same configuration as the first reaction control circuit 41A. The second reaction control circuit 42A calculates a target steering reaction force to be generated by the reaction motor 21 based on the steering torque Th detected by the torque sensor 23 and calculates a second current command value for the winding group N12 of the second system based on the value of the calculated target steering reaction force. Here, the second current command value is set to a value of a half of the amount of current required for the reaction motor 21 to generate the target steering reaction force. The second reaction control circuit 42A generates a drive signal for the motor driving circuit 42B by performing current feedback control for causing a value of an actual current supplied to the winding group N12 of the second system to conform to the second current command value.

The motor driving circuit 42B basically has the same configuration as the motor driving circuit 41B. The motor driving circuit 42B converts DC electric power supplied from the DC power source 60 to three-phase AC electric power based on a drive signal generated by the second reaction control circuit 42A. The three-phase AC electric power generated by the motor driving circuit 42B is supplied to the winding group N12 of the second system of the reaction motor 21 via power supply paths of the phases including a bus bar or a cable. Accordingly, the winding group N12 of the second system generates a torque corresponding to the second current command value. The reaction motor 21 generates a total torque of the torque generated by the winding group N11 of the first system and the torque generated by the winding group N12 of the second system.

Depending on product specifications, a master-slave relationship may be provided between the first system circuit 41 and the second system circuit 42 of the reaction control device 40. In this case, for example, the first system circuit 41 may serve as a master and the second system circuit 42 may serve as a slave. Depending on product specifications, the first system circuit 41 and the second system circuit 42 may have an equivalent relationship.

Turning Control Device

The configuration of the turning control device 50 will be described below in detail. As illustrated in FIG. 2, the turning control device 50 includes the first system circuit 51 and the second system circuit 52. The first system circuit 51 includes a first turning control circuit 51A and a motor driving circuit 51B. The second system circuit 52 includes a second turning control circuit 52A and a motor driving circuit 52B.

The first turning control circuit 51A basically has the same configuration as the first reaction control circuit 41A. The first turning control circuit 51A calculates a target turning angle for the turning wheels 15 based on the steering angle θs detected by the steering angle sensor 24. The turning control device 50 calculates a turning angle θw based on the stroke Xw of the turning shaft 13 detected by the stroke sensor 34. The first turning control circuit 51A calculates a target turning force to be generated by the turning motor 31 by performing angle feedback control for causing the turning angle θw calculated based on the stroke Xw to conform to the target turning angle and calculates a third current command value for the winding group N21 of the first system of the turning motor 31 based on the value of the calculated target turning force. Here, the third current command value is set to a value of a half (50%) of an amount of current (100%) required for the turning motor 31 to generate the target turning force. The first turning control circuit 51A generates a drive signal for the motor driving circuit 51B by performing current feedback control for causing a value of an actual current supplied to the winding group N21 of the first system to conform to the third current command value.

The motor driving circuit 51B basically has the same configuration as the motor driving circuit 41B. The motor driving circuit 51B converts DC electric power supplied from the DC power source 60 to three-phase AC electric power based on the drive signal generated by the first turning control circuit 51A. The three-phase AC electric power generated by the motor driving circuit 42B is supplied to the winding group N21 of the first system of the turning motor 31 via power supply paths of the phases including a bus bar or a cable. Accordingly, the winding group N21 of the first system generates a torque corresponding to the third current command value.

The second turning control circuit 52A basically has the same configuration as the first reaction control circuit 41A. The second turning control circuit 52A calculates a target turning angle for the turning wheels 15 based on a steering angle θs detected by the steering angle sensor 24. The turning control device 50 calculates a turning angle θw based on the stroke Xw of the turning shaft 13 detected by the stroke sensor 34. The second turning control circuit 52A calculates a target turning force to be generated by the turning motor 31 by performing angle feedback control for causing the turning angle θw calculated based on the stroke Xw to conform to the target turning angle and calculates a fourth current command value for the winding group N22 of the second system of the turning motor 31 based on the value of the calculated target turning force. Here, the fourth current command value is set to a value of a half (50%) of the amount of current required for the turning motor 31 to generate the target turning force. The second turning control circuit 52A generates a drive signal for the motor driving circuit 52B by performing current feedback control for causing a value of an actual current supplied to the winding group N22 of the second system to conform to the fourth current command value.

The motor driving circuit 52B basically has the same configuration as the motor driving circuit 41B. The motor driving circuit 51B converts DC electric power supplied from the DC power source 60 to three-phase AC electric power based on the drive signal generated by the second turning control circuit 52A. The three-phase AC electric power generated by the motor driving circuit 52B is supplied to the winding group N22 of the second system of the turning motor 31 via power supply paths of the phases including a bus bar or a cable. Accordingly, the winding group N22 of the second system generates a torque corresponding to the fourth current command value. The turning motor 31 generates a total torque of the torque generated by the winding group N21 of the first system and the torque generated by the winding group N22 of the second system.

Depending on product specifications, a master-slave relationship may be provided between the first system circuit 51 and the second system circuit 52 of the turning control device 50. In this case, for example, the first system circuit 51 may serve as a master and the second system circuit 52 may serve as a slave. Depending on product specifications, the first system circuit 51 and the second system circuit 52 may have an equivalent relationship.

Communication Path

Internal communication paths of the reaction control device 40 and the turning control device 50 and a communication path between the reaction control device 40 and the turning control device 50 will be described below.

As illustrated in FIG. 2, the first reaction control circuit 41A and the second reaction control circuit 42A transmit and receive information therebetween via a communication line L1. The information includes abnormality information of the first reaction control circuit 41A, the second reaction control circuit 42A, or the motor driving circuit 41B or 42B. The information also includes values of flags indicating various states. The first reaction control circuit 41A and the second reaction control circuit 42A cooperatively control driving of the reaction motor 21 based on the information transmitted and received therebetween.

The first turning control circuit 51A and the second turning control circuit 52A transmit and receive information therebetween via a communication line L2. The information includes abnormality information of the first turning control circuit 51A, the second turning control circuit 52A, or the motor driving circuit 51B or 52B. The information also includes values of flags indicating various states. The first turning control circuit 51A and the second turning control circuit 52A cooperatively control driving of the turning motor 31 based on the information transmitted and received therebetween.

The first reaction control circuit 41A and the first turning control circuit 51A transmit and receive information therebetween via a communication line L3. The information includes abnormality information of the first reaction control circuit 41A, the first turning control circuit 51A, or the motor driving circuit 41B or 51B. The information also includes values of flags indicating various states. The first reaction control circuit 41A and the first turning control circuit 51A cooperatively control driving of the turning motor 31 based on the information transmitted and received therebetween.

The second reaction control circuit 42A and the second turning control circuit 52A transmit and receive information therebetween via a communication line L4. The information includes abnormality information of the second reaction control circuit 42A, the second turning control circuit 52A, or the motor driving circuit 42B or 52B. The information also includes values of flags indicating various states. The second reaction control circuit 42A and the second turning control circuit 52A cooperatively operate based on the information transmitted and received therebetween.

Drive Mode of Motor

Drive modes of the reaction motor 21 and the turning motor 31 will be described below. The drive modes include a cooperative drive mode, an independent drive mode, and a one-system drive mode.

The cooperative drive mode is a drive mode when the first system circuits 41 and 51 and the second system circuits 42 and 52 are normally operating. The first system circuit 41 and the second system circuit 42 share information such as the command values and the limit values and cause both the winding group N11 of the first system and the winding group N12 of the second system of the reaction motor 21 to generate the same torque. The first system circuit 51 and the second system circuit 52 share information such as the command values and the limit values and cause both the winding group N21 of the first system and the winding group N22 of the second system of the turning motor 31 to generate the same torque.

The independent drive mode is a drive mode when the operation of one of four control circuits (41A, 42A, 51A, and 52A) stops instantaneously, an abnormality has not been determined, and there is a likelihood of return to a normal operation. In the independent drive mode, for example, when there is a likelihood that one control circuit of which the operation has stopped will return to a normal operation, the other three control circuits cause a winding group corresponding to the corresponding control circuits to generate a torque based on the calculation results of the corresponding control circuits without using information through inter-system communication.

The one-system drive mode is a drive mode when an abnormality of one of four control circuits (41A, 42A, 51A, and 52A) has been determined and there is no likelihood of return to a normal operation without performing a reset process of powering on the vehicle again. For example, when an abnormality in the first reaction control circuit 41A or the first turning control circuit 51A has been determined, the first reaction control circuit 41A and the first turning control circuit 51A are caused to stop driving control of the reaction motor 21 and the turning motor 31, and the reaction motor 21 and the turning motor 31 are caused to generate a torque using only the second system circuits 42 and 52. Similarly, when an abnormality in the second reaction control circuit 42A or the second turning control circuit 52A has been determined, the second reaction control circuit 42A and the second turning control circuit 52A are caused to stop driving control of the reaction motor 21 and the turning motor 31, and the reaction motor 21 and the turning motor 31 are caused to generate a torque using only the first system circuits 41 and 51.

State Transition of Control Circuits

State transitions of the control circuits (41A, 42A, 51A, and 52A) will be described below. When the start switch SW is turned on, the control circuits perform a starting process and initial check. The starting process and the initial check are a series of processes required for the steering system to start. The starting process and the initial check include, for example, check of hardware, initialization of a central processing unit (CPU), and initialization of variables, flags, or the like. Control statuses of the control circuits while the starting process and the initial check are being performed are an unassisted state. The unassisted state is a state in which control of the reaction motor 21 and the turning motor 31 has not been started yet. The control statuses are operation states of the control circuits.

After execution of the initial check has been normally completed, the control statuses of the control circuits transition from an unassisted state to an assist start waiting state. The assist start waiting state is a state in which normal completion of the initial check in all the control circuits is waited for.

When the initial check in all the control circuits has been normally completed, the control devices can perform control of the reaction motor 21 or the turning motor 31. The control statuses of the control circuits transition from the assist start waiting state to a normal control status. The control circuits start normal control for generating a steering reaction force and a turning force based on the steering state of the steering wheel 11. In the normal control status, the drive modes of the reaction motor 21 and the turning motor 31 are the cooperative drive mode. That is, in the normal control status, the control circuits cause both the winding group N11 of the first system and the winding group N12 of the second system of the reaction motor 21 to generate a torque and causes both the winding group N21 of the first system and the winding group N22 of the second system of the turning motor 31 to generate a torque.

When the control statuses of the control circuits are the assist start waiting state or the normal control status and predetermined abnormality determination conditions are satisfied, the control statuses of the control circuits transition from the assist start waiting state to the independent drive mode or the one-system drive mode. When the control statuses of the control circuits are the independent drive mode and predetermined return conditions are satisfied, the control statuses of the control circuits return from the independent drive mode to the normal control status. When the control statuses of the control circuits are the state of the independent drive mode and predetermined abnormality determination conditions are satisfied, the control statuses of the control circuits transition from the state of the independent drive mode to the state of the one-system drive mode.

A control circuit that is performing motor driving control out of the control circuits perform power latch control when the start switch SW is turned off. When the start switch SW is turned off, the vehicle stops.

For example, in a normal control status, the control circuits (41A, 42A, 51A, and 52A) perform power latch control after the start switch SW has been turned off and, for example, continues to perform a temperature estimating operation for an element on a board.

For example, in the state of the one-system drive mode in which an abnormality of the first reaction control circuit 41A or the first turning control circuit 51A has been determined and driving control for the reaction motor 21 and the turning motor 31 is being performed using the second system circuits 42 and 52, the control circuits (42A and 52A) performing the motor driving control out of the control circuits perform power latch control after the start switch SW has been turned off and, for example, continues to perform a temperature estimating operation for an element on a board.

Examples of the elements include switching elements of the motor driving circuits (41B, 42B, 51B, and 52B). The control circuits continues to supply electric power until a predetermined time elapses after the start switch SW has been turned off or until the temperature of the elements on the board or the like becomes equal to or lower than a predetermined temperature. The predetermined temperature is a sufficiently low temperature.

When the temperature of the elements on the board or the like becomes equal to or lower than the predetermined temperature, the control circuits store the temperature of the elements on the board at that time in a nonvolatile memory and ends execution of power latch control. By performing the power latch control, the control circuits can accurately ascertain the initial temperature of the elements on the board or the like at the time of subsequently performing normal control and appropriately perform overheating protection control. Overheating protection control is control for curbing overheating the elements on the board or the like by limiting reaction control or turning control according to an increase in temperature from the initial temperature of the elements on the board or the like.

Here, it is assumed that the start switch SW is turned on again in a period in which power latch control is being performed after the start switch SW has been turned off. In this case, there is following concern. That is, when the start switch SW is turned on in the period in which power latch control is being performed, the timings at which the control circuits recognize turning-on of the start switch SW may not match due to a difference in wiring resistance or the like. Accordingly, there is concern that timings at which the control circuits restart may mismatch. As a result, there is concern that an earlier restarted control circuit may perform an unintentional state transition by receiving pre-initialization information from another control circuit that is still performing the power latch control.

Comparative Example of State Transition

A comparative example of state transitions of the control circuits (41A, 42A, 51A, and 52A) will be described below. For example, the following description is based on the premise of the following situations.

That is, it is assumed that the vehicle has been powered off in a state in which an abnormality of the first reaction control circuit 41A is determined, driving of the motors by the first system circuits 41 and 51 is stopped, and the reaction motor 21 and the turning motor 31 in the one-system drive mode by the second system circuits 42 and 52 are being driven. When the vehicle has been powered off, the first reaction control circuit 41A and the first turning control circuit 51A which are elements of the first system which is an abnormal system do not perform power latch control and stop their operations as indicated by a lateral line "−" in FIG. 3. The second reaction control circuit 42A and the second turning control circuit 52A which are elements of the second system which is a normal system perform power latch control. The second reaction control circuit 42A and the second turning control circuit 52A maintain the operation modes of the reaction motor 21 and the turning motor 31 immediately before the vehicle has been powered off. Here, the operation modes of the reaction motor 21 and the turning motor 31 immediately before the vehicle has been powered off are a system 1 failure mode. The system 1 failure mode is an operation mode in a state in which the first system has failed. The state in which the first system has failed includes a state in which an abnormality has occurred in the first reaction control circuit 41A or the first turning control circuit 51A.

In addition, the operation mode in a state in which the second system has failed is a system 2 failure mode. The state in which the second system has failed includes a state in which an abnormality has occurred in the second reaction control circuit 42A or the second turning control circuit 52A.

When the vehicle is powered on again in the period in which power latch control is being performed after the vehicle has been powered off as illustrated in the timing chart of FIG. 3 (time T1), the first reaction control circuit 41A may be able to return to a normal operation. The state in which the first reaction control circuit 41A is able to return to the normal operation means a state in which it can return to the cooperative drive mode which is a drive mode when the first system circuits 41 and 51 and the second system circuits 42 and 52 operate normally. For example, in a period in which an abnormality of the first reaction control circuit 41A has been determined due to temporary overheating of an element of the first reaction control circuit 41A and until the vehicle is powered on again after the abnormality of the first reaction control circuit 41A has been determined, the temperature of the element of the first reaction control circuit 41A may be sufficiently lowered.

In this case, it is conceivable that the first reaction control circuit 41A recognizes the powering-on of the vehicle earlier than the other three control circuits (42A, 51A, and 52A). The other three control circuits do not recognize that the vehicle has been powered on and the second reaction control circuit 42A and the second turning control circuit 52A thereof continue to perform power latch control which is one mode of stop control ST5. In the timing chart of FIG. 3, the state in which the control circuits have recognized the powering-on of the vehicle is referred to as "ON," and the state in which the control circuits have not recognized that the vehicle has been powered on is referred to as "OFF."

When it is determined that the vehicle has been powered on, the first reaction control circuit 41A performs the starting process ST1 and the initial check ST2 and then performs the assist start waiting state ST3. The control status of the first reaction control circuit 41A transitions from the unassisted state CS1 to the state of the independent drive mode CS3 via the assist start waiting state CS2. This is because even the first reaction control circuit 41A and the second reaction control circuit 42A synchronize the operation modes of the reaction motor 21 and the turning motor 31.

That is, when the control status transitions to the assist start waiting state as indicated by an arrow D1 in FIG. 3, the first reaction control circuit 41A recognizes the operation modes of the reaction motor 21 and the turning motor 31 which are recognized by the second reaction control circuit 42A. When it is recognized that the first system fails, the first reaction control circuit 41A starts the stopping control ST4 of stopping its own operation and causes the control status thereof to transition from the state of independent drive mode CS3 to a non-assist state CS4. The non-assist state CS4 is a state in which control of the reaction motor 21 and the turning motor 31 is not performed. The first reaction control circuit 41A transitions finally to a sleep state in which it waits in a power-save state.

For example, when it is determined that the vehicle has been powered on (time T2), the other three control circuits (42A, 51A, and 52A) starts the starting process ST1. When the control status has transitioned to the assist start waiting state ST3 as indicated by an arrow D2 in FIG. 3, the second reaction control circuit 42A recognizes the operation modes of the reaction motor 21 and the turning motor 31 recognized by the first reaction control circuit 41A. When it is recognized that the first system has failed, the second reaction control circuit 42A causes the control status thereof to transition to the state of one-system drive mode CS5 using the second system. The second reaction control circuit 42A controls driving of the reaction motor 21 in the one-system drive mode (motor control ST6).

As indicated by an arrow D3 in FIG. 3, the first turning control circuit 51A recognizes the operation modes of the reaction motor 21 and the turning motor 31 recognized by the first reaction control circuit 41A, for example, at a time point at which the starting process ST1 has been completed. When it is recognized that the first system has failed, the first turning control circuit 51A starts the stopping control ST4 of stopping its operation and causes the control status thereof to transition from the unassisted state CS1 to the non-assist state CS4. The first turning control circuit 51A finally reaches the sleep state.

When the control status transitions to the assist start waiting state CS2 as indicated by an arrow D4 in FIG. 3, the second turning control circuit 52A recognizes the operation modes of the reaction motor 21 and the turning motor 31 which are recognized by the first turning control circuit 51A. When it is recognized that the first system fails, the second turning control circuit 52A causes the control status thereof to transition to the state of one-system drive mode CS5 using the second system. The second turning control circuit 52A controls driving of the turning motor 31 in the one-system drive mode (motor control ST6).

In this way, when the vehicle is powered on again in the period in which power latch control is being performed after the vehicle has been powered off, the operation modes of the reaction motor 21 and the turning motor 31 (the system 1 failure mode) are synchronized between the control circuits (41A, 42A, 51A, and 52A). Accordingly, although the first reaction control circuit 41A is able to return to the normal operation, the control statuses of the second reaction control circuit 42A and the second turning control circuit 52A unintentionally transition to the state of one-system drive mode using the second system.

Transition Conditions of Control Status

Therefore, in this embodiment, transition conditions of the control statuses of the control circuits (41A, 42A, 51A, and 52A) are set as follows. That is, when the vehicle has been powered on, the control circuits do not perform the process of synchronizing the operation modes in the period until all the control circuits start normally and are able to control the reaction motor 21 and the turning motor 31 after the powering-on of the vehicle has been recognized. The case in which the vehicle is powered on includes, for example, a case in which the vehicle is firstly powered on in a parked state and a case in which the vehicle is powered on again in the period in which power latch control is being performed. When the vehicle is powered on again in the period in which power latch control is being performed and the operation mode of the motors (21 and 31) recognized by the corresponding control circuits are different from the operation modes of the motors recognized by the other control circuits, the control circuits do not perform the process of synchronizing the operation modes until all the control circuits are able to perform control of the motors.

Examples of State Transition

State transitions of the control circuits (41A, 42A, 51A, and 52A) according to this embodiment will be described below. The assumed premise is the same as in the aforementioned comparative example.

When the vehicle is powered on again in the period in which power latch control is being performed after the vehicle has been powered off as illustrated in the timing chart of FIG. 4 (time T1), the first reaction control circuit 41A is able to return to the normal operation. The first reaction control circuit 41A recognizes that the vehicle has been powered on earlier than the other three control circuits (42A, 51A, and 52A). The other three control circuits do not recognize that the vehicle has been powered on, and the second reaction control circuit 42A and the second turning control circuit 52A continue to perform the power latch control which is one mode of the stopping control ST5.

When it is determined that the vehicle has been powered on, the first reaction control circuit 41A performs the starting process ST1 and the initial check ST2 and finally reaches the assist start waiting state ST3. The control status of the first reaction control circuit 41A transitions from the unassisted state CS1 to the assist start waiting state CS2. At this time, the operation mode of the motors (21 and 31) recognized by the first reaction control circuit 41A is a normal mode. The normal mode is an operation mode in which both the first system and the second system are normal. On the other hand, the operation mode of the motors (21 and 31) recognized by the second reaction control circuit 42A is the system 1 failure mode. In this way, the operation modes of the motors recognized by the first reaction control circuit 41A and the second reaction control circuit 42A are different. However, the first reaction control circuit 41A does not perform a process of synchronizing the operation mode of the motors recognized therein with the operation mode of the motors recognized by the second reaction control circuit 42A in the period of the assist start waiting state CS2. Accordingly, the control status of the first reaction control circuit 41A is maintained as the assist start waiting state CS2.

The other three control circuits (42A, 51A, and 52A) start the starting process ST1 and the initial check ST2, for example, when it is determined that the vehicle has been powered on (time T2). At the timing at which the initial check ST2 performed by the other three control circuits is normally completed, the control circuits (41A, 42A, 51A, and 52A) cause the control status to a normal control status CS6. The operation mode of the motors (21 and 31) recognized by the control circuits (41A, 42A, 51A, and 52A) is maintained in a correct operation mode, that is, a state synchronized with the normal control status CS6. The first reaction control circuit 41A and the second reaction control circuit 42A control driving of the reaction motor 21 in the cooperative drive mode which is a drive mode in a normal state (motor control ST6). The first turning control circuit 51A and the second turning control circuit 52A control driving of the turning motor 31 in the cooperative drive mode (motor control ST6).

In this way, when the vehicle is powered on again in the period in which power latch control is being performed, the control circuits (41A, 42A, 51A, and 52A) normally start their operations as intended even if the first reaction control circuit 41A in the state in which it is able to return to the normal operation has recognized that the vehicle has been powered on earlier than the other three control circuits (42A, 51A, and 52A). Unlike the aforementioned comparative example, the operation mode of the reaction motor 21 and the turning motor 31 do not unintentionally transition to the one-system drive mode using the second system even if the first reaction control circuit 41A is able to return to the normal operation.

When the vehicle is powered on again in the period in which power latch control is being performed after the vehicle has been powered off in a state in which an abnormality of a specific control circuit has been determined out of the other three control circuits (42A, 51A, and 52A), the specific control circuit operates in the same way as the first reaction control circuit 41A.

Advantages of First Embodiment

Accordingly, the following advantages can be achieved in this embodiment. When the vehicle is powered on again in the period in which power latch control is being performed after the vehicle has been powered off, the control circuits (41A, 42A, 51A, and 52A) do not perform the process of synchronizing the operation modes even if the operation mode of the motors (21 and 31) recognized therein is different from the operation mode of the motors (21 and 31) recognized by the other control circuits. For example, when the vehicle is powered on again in the period in which power latch control is being performed after the vehicle has been powered off in a state in which an abnormality of a specific control circuit (41A) has been determined out of the other three control circuits, the specific control circuit may be able to return to the normal operation and recognize that the vehicle has been powered on earlier than the other control circuits (42A, 51A, and 52A). In this case, the specific control circuit (41A) does not perform the process of synchronizing the operation modes of the motors (21 and 31) in the period of the assist start waiting state in which it waits for normal completion of the initial check performed by the other control circuits (42A, 51A, and 52A). Accordingly, the operation mode of the motors recognized by the specific control circuit (41A) does not unintentionally transition to the operation mode (for example, the one-system drive mode) of the motors recognized by the other control circuits (42A, 51A, and 52A). As a result, the control circuits (41A, 42A, 51A, and 52A) normally start their operations. Accordingly, it is possible to appropriately control driving of the reaction motor 21 and the turning motor 31.

The synchronization process is performed between the first reaction control circuit 41A and the second reaction control circuit 42A, between the first turning control circuit 51A and the second turning control circuit 52A, between the first reaction control circuit 41A and the first turning control circuit 51A, and between the second reaction control circuit 42A and the second turning control circuit 52A. Accordingly, it is possible to simplify signal paths in comparison with a configuration in which the control circuits (41A, 42A, 51A, and 52A) perform the synchronization process with all the other control circuits other than the corresponding control circuit. For example, it is not necessary to provide a communication line between the first reaction control circuit 41A and the second turning control circuit 52A and a communication line between the second reaction control circuit 42A and the first turning control circuit 51A.

Second Embodiment

A second embodiment in which a control device for a vehicle is embodied for an electric power steering system will be described below. The same elements as in the first embodiment will be referred to by the same reference signs, and detailed description thereof will be omitted.

In the electric power steering system, the steering wheel 11 and the turning wheels 15 illustrated in FIG. 1 are mechanically connected. That is, the steering shaft 12, the pinion shaft 33, and the turning shaft 13 serve as a power transmission path between the steering wheel 11 and the turning wheels 15. When the turning shaft 13 moves linearly with steering of the steering wheel 11, a turning angle θw of the turning wheels 15 changes.

The electric power steering system includes an assist motor and an assist control device. The assist motor is provided at the same position as the reaction motor 21 or the turning motor 31 illustrated in FIG. 1. The assist motor generates an assist force for assisting with the operation of the steering wheel 11. The assist force is a torque in the same direction as the steering direction of the steering wheel 11. The assist control device controls driving of the assist motor which is a control object.

Figure 5:
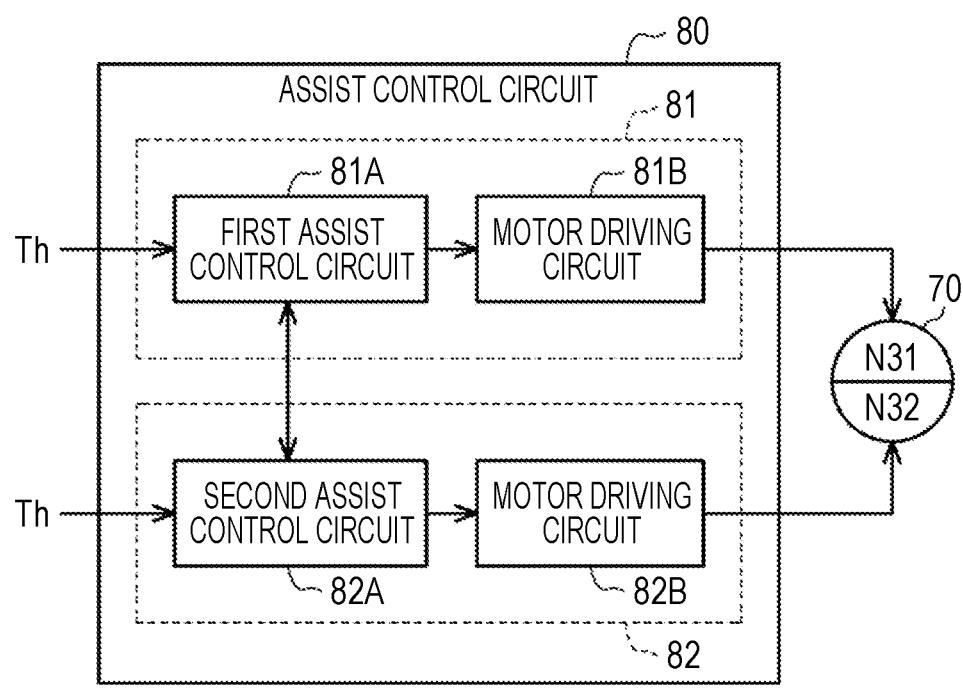
FIG. 5 is a diagram illustrating a configuration of a control device for a vehicle according to a second embodiment.

As illustrated in FIG. 5, the assist motor 70 includes a winding group N31 of the first system and a winding group N32 of the second system. The assist control device 80 includes a first system circuit 81. The first system circuit 81 includes a first assist control circuit 81A and a motor driving circuit 81B. The first assist control circuit 81A controls supply of electric power to the winding group N31 of the first system. The first assist control circuit 81A generates a drive signal for the motor driving circuit 81B based on a steering torque Th detected by the torque sensor 23.

The motor driving circuit 81B converts DC electric power supplied from the DC power source 60 to three-phase AC electric power based on the drive signal generated by the first assist control circuit 81A. The three-phase AC electric power generated by the motor driving circuit 81B is supplied to the winding group N31 of the first system of the assist motor 70 via power supply paths for the phases including a bus bar or a cable.

The assist control device 80 includes a second system circuit 82. The second system circuit 82 includes a second assist control circuit 82A and a motor driving circuit 82B. The second assist control circuit 82A controls supply of electric power to the winding group N32 of the second system. The second assist control circuit 82A generates a drive signal for the motor driving circuit 82B based on the steering torque Th detected by the torque sensor 23.

The motor driving circuit 82B converts DC electric power supplied from the DC power source 60 to three-phase AC electric power based on the drive signal generated by the second assist control circuit 82A. The three-phase AC electric power generated by the motor driving circuit 82B is supplied to the winding group N32 of the second system of the assist motor 70 via power supply paths for the phases including a bus bar or a cable.

The first assist control circuit 81A and the second assist control circuit 82A transmit and receive information therebetween via a communication line. The information includes abnormality information of the first assist control circuit 81A, the second assist control circuit 82A, or the motor driving circuit 81B or 82B. The information also includes values of various flags. The first assist control circuit 81A and the second assist control circuit 82A cooperatively control driving of the assist motor 70 based on the information transmitted and received therebetween.

The first assist control circuit 81A and the second assist control circuit 82A control driving of the assist motor in one drive mode of the cooperative drive mode, the independent drive mode, and the one-system drive mode similarly to the control circuits (41A, 42A, 51A, and 52A) according to the first embodiment. The control status of the first assist control circuit 81A and the second assist control circuit 82A transitions in the same way as the control status of the control circuits (41A, 42A, 51A, and 52A) according to the first embodiment. The state of the first assist control circuit 81A and the second assist control circuit 82A transition in the same way as the state of the control circuits (41A, 42A, 51A, and 52A) according to the first embodiment.

The first assist control circuit 81A and the second assist control circuit 82A perform power latch control for maintaining supply of electric power thereto when the start switch SW is turned off, that is, the vehicle is powered off, in the state in which normal control for controlling the assist motor in the cooperative drive mode is being performed. The first assist control circuit 81A and the second assist control circuit 82A operate in the same way as the control circuits (41A, 42A, 51A, and 52A) according to the first embodiment when power latch control is being performed.

That is, when the vehicle is powered on, the first assist control circuit 81A and the second assist control circuit 82A do not perform the process of synchronizing the operation modes in the period until all the control circuits start normally and are able to control the assist motor after the powering-on of the vehicle has been recognized.

When the vehicle is powered on again in the period in which power latch control is being performed, the first assist control circuit 81A does not perform the process of synchronizing the operation modes even if the operation mode of the assist motor recognized by the first assist control circuit 81A is different from the operation mode of the assist motor recognized by the second assist control circuit 82A. When the vehicle is powered on again in the period in which power latch control is being performed, the second assist control circuit 82A does not perform the process of synchronizing the operation modes even if the operation mode of the assist motor recognized by the second assist control circuit 82A is different from the operation mode of the assist motor recognized by the first assist control circuit 81A.

For example, when the vehicle is powered on in the period in which power latch control is being performed after the vehicle has been powered off in the state in which an abnormality of the first assist control circuit 81A has been determined, the first assist control circuit 81A may be able to return to the normal operation and recognize that the vehicle has been powered on earlier than the second assist control circuit 82A. In this case, the first assist control circuit 81A does not perform the process of synchronizing the operation modes of the assist motor in the period of the assist start waiting state in which it waits for normal completion of the initial check of the second assist control circuit 82A. Accordingly, the operation mode of the assist motor recognized by the first assist control circuit 81A does not unintentionally transition to the operation mode (for example, the one-system drive mode) of the assist motor recognized by the second assist control circuit 82A. Accordingly, the first assist control circuit 81A and the second assist control circuit 82A normally start their operations.

When the vehicle is powered on in the period in which power latch control is being performed after the vehicle has been powered off in the state in which an abnormality of the second assist control circuit 82A has been determined, the second assist control circuit 82A operates in the same way as the first assist control circuit 81A.

Advantages of Second Embodiment

Accordingly, the following advantages can be achieved in the second embodiment. When the vehicle is powered on again in the period in which power latch control is being performed after the vehicle has been powered off, the first assist control circuit 81A and the second assist control circuit 82A do not perform the process of synchronizing the operation mode thereof with the other operation mode even if the operation mode of the assist motor recognized by the corresponding assist control circuit is different from the operation mode of the assist motor recognized by the other control circuits. Accordingly, the operation mode of the motors recognized by the first assist control circuit 81A does not unintentionally transition to the operation mode of the motors recognized by the second assist control circuit 82A. The operation mode of the motors recognized by the second assist control circuit 82A does not unintentionally transition to the operation mode of the motors recognized by the first assist control circuit 81A. Accordingly, the first assist control circuit 81A and the second assist control circuit 82A normally start their operations. As a result, it is possible to appropriately control driving of the assist motor.

Other Embodiments

The first and second embodiments may be modified as follows. In the first embodiment, the reaction motor 21 and the turning motor 31 include the winding groups of two systems, but may include a winding group of a system. In this case, the reaction control device 40 may include only one of the first system circuit 41 and the second system circuit 42. In this case, the turning control device 50 may include only one of the first system circuit 51 and the second system circuit 52. The first reaction control circuit 41A or the second reaction control circuit 42A corresponds to a reaction control circuit in the claims. The first turning control circuit 51A or the second turning control circuit 52A correspond to a turning control circuit in the claims.

The control device for a vehicle is embodied in the steer-by-wire steering system in the first embodiment and the control device for a vehicle is embodied in the electric power steering system in the second embodiment, but the control device for a vehicle may be embodied, for example, in a door mirror system that is opened and closed along with a door lock. The control device for a vehicle can be embodied in all motor control devices including a redundant control circuit and a motor driving circuit.

What is claimed is:

1. A control device for a vehicle, comprising:
a plurality of control circuits configured to control a control object in cooperation or in combination by starting with powering-on of the vehicle as a trigger,
wherein each of the plurality of control circuits is configured to perform a synchronization process and power latch control, the synchronization process being a process of synchronizing operation modes of the control object which are determined based on operation states thereof with each other, the power latch control being control for maintaining supply of electric power in a defined period with powering-off of the vehicle as a trigger,
wherein each of the plurality of control circuits is configured to maintain the operation mode immediately before the vehicle has been powered off in a period in which the power latch control is being performed, and
wherein each of the plurality of control circuits is configured not to perform the synchronization process in a predetermined period when the vehicle has been powered on, the predetermined period being a period from a time point at which the vehicle has been powered on to a time point at which all of the plurality of control circuits normally start and are able to control the control object.

2. The control device for the vehicle according to claim 1, wherein the operation mode includes an operation mode when all of the plurality of control circuits are normal and an operation mode when one of the plurality of control circuits is abnormal.

3. The control device for the vehicle according to claim 1, wherein the control object includes:
a reaction motor that includes winding groups of two systems and generates a steering reaction force which is applied to a steering wheel of which transmission of power to and from turning wheels is cut off; and
a turning motor that generates a turning force for turning the turning wheels; and
wherein the plurality of control circuits includes:
a first reaction control circuit configured to control supply of electric power to a winding group of a first system of the reaction motor;
a second reaction control circuit configured to control supply of electric power to a winding group of a second system of the reaction motor;
a first turning control circuit configured to control supply of electric power to a winding group of a first system of the turning motor; and
a second turning control circuit configured to control supply of electric power to a winding group of a second system of the turning motor.

4. The control device for the vehicle according to claim 3, wherein the synchronization process is performed between the first reaction control circuit and the second reaction control circuit, between the first turning control circuit and the second turning control circuit, between the first reaction control circuit and the first turning control circuit, and between the second reaction control circuit and the second turning control circuit.

5. The control device for the vehicle according to claim 1, wherein the control object includes:
a reaction motor that is a source of a steering reaction force which is applied to a steering wheel of which transmission of power to and from turning wheels is cut off; and
a turning motor that is a source of a turning force for turning the turning wheels, and
wherein the plurality of control circuits includes:
a reaction control circuit configured to control the reaction motor; and
a turning control circuit configured to control the turning motor.

6. The control device for the vehicle according to claim 1, wherein the control object includes an assist motor that generates an assist force for assisting with an operation of a steering wheel, wherein the assist motor includes a winding group of a first system and a winding group of a second system, and wherein the plurality of control circuits includes:
 a first assist control circuit configured to control supply of electric power to the winding group of the first system; and
 a second assist control circuit configured to control supply of electric power to the winding group of the second system.

\* \* \* \* \*